(12) United States Patent
Freeman et al.

(10) Patent No.: US 8,325,465 B2
(45) Date of Patent: Dec. 4, 2012

(54) NBO CAPACITORS WITH IMPROVED PERFORMANCE AND HIGHER WORKING VOLTAGES

(75) Inventors: Yuri Freeman, Greer, SC (US); Philip M. Lessner, Newberry, SC (US); Jeffrey Poltorak, Fountain Inn, SC (US); Randolph S. Hahn, Simpsonville, SC (US)

(73) Assignee: Kemet Electronics Corporation, Greenville, SC (US)

( * ) Notice: Subject to any disclaimer, the term of this patent is extended or adjusted under 35 U.S.C. 154(b) by 1056 days.

(21) Appl. No.: 12/169,243

(22) Filed: Jul. 8, 2008

(65) Prior Publication Data

US 2008/0266755 A1 Oct. 30, 2008

Related U.S. Application Data

(63) Continuation-in-part of application No. 12/062,738, filed on Apr. 4, 2008.

(60) Provisional application No. 60/923,422, filed on Apr. 13, 2007.

(51) Int. Cl.
*H01G 9/04* (2006.01)

(52) U.S. Cl. ........ 361/528; 361/517; 361/519; 361/523; 361/525; 361/529

(58) Field of Classification Search ............... 361/528, 361/516–519, 523, 525, 529–530, 540–541, 361/502–504
See application file for complete search history.

(56) References Cited

U.S. PATENT DOCUMENTS

| | | | |
|---|---|---|---|
| 6,215,652 B1 * | 4/2001 | Yoshida et al. | 361/524 |
| 6,358,625 B1 | 3/2002 | Kumar et al. | |
| 6,416,730 B1 | 7/2002 | Fife | |
| 7,154,741 B2 | 12/2006 | Kuriyama | |
| 2004/0149356 A1 | 8/2004 | Spaniol | |

FOREIGN PATENT DOCUMENTS

JP 20050169281 5/2005

OTHER PUBLICATIONS

Suppression of Field Crystalliztion of Anodic Niobia by Oxygen, *Journal of the Electrochemical Society*, 153 (5) B173-B177 (2006), Habazaki et al.
Comparison of the Degradation Modes in Sandwich Structures Including Amorphous Oxides of Niobium and Tantalum, *Thin Solid Films*, 229 (1991) 207-215, Bioko, et al.

* cited by examiner

*Primary Examiner* — Nguyen T Ha
(74) *Attorney, Agent, or Firm* — Joseph T. Guy; Nexsen Pruet, LLC

(57) ABSTRACT

A capacitor is described with an NbO anode. The capacitor has an NbO anode and an NbO anode lead extending from the NbO anode. A dielectric is on the NbO anode and a conductor is on the dielectric.

14 Claims, 2 Drawing Sheets

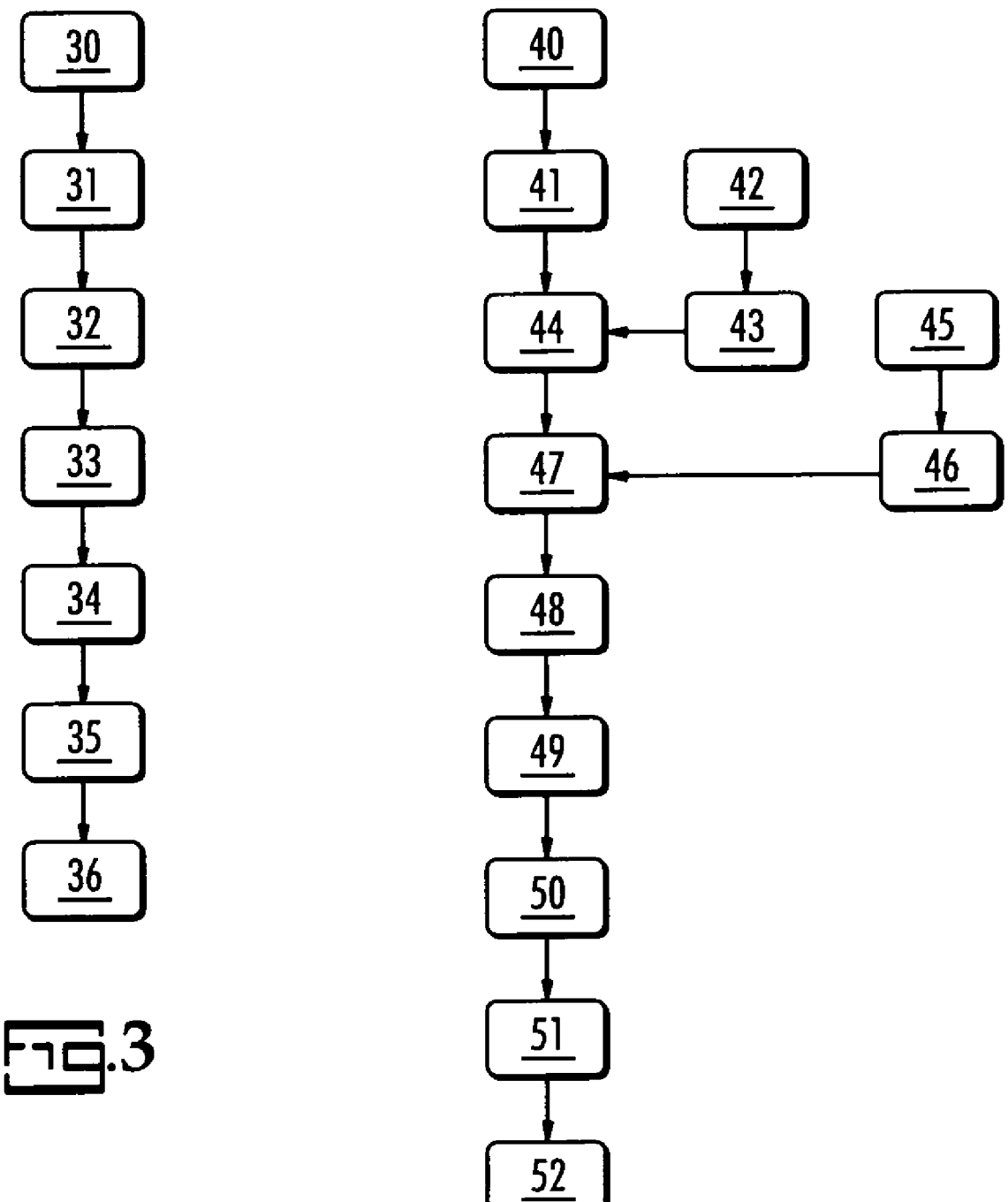

NBO CAPACITORS WITH IMPROVED PERFORMANCE AND HIGHER WORKING VOLTAGES

CROSS-REFERENCE TO RELATED APPLICATIONS

This application is a continuation-in-part of pending U.S. patent application Ser. No. 12/062,738 filed Apr. 4, 2008 which, in-turn, claims priority to U.S. Provisional Appl. No. 60/923,422 filed Apr. 13, 2007 both of which are incorporated herein by reference.

BACKGROUND OF THE INVENTION

This invention relates to a method for manufacturing NbO electrolytic capacitors, and capacitors formed thereby, with improved performance and an extended range of working voltages.

Electrolytic capacitors containing anodes made from niobium oxides and sub-oxides (typically NbO) were first described by James Fife in U.S. Pat. No. 6,416,730. These anodes were made by placing a lead wire into NbO powder and pressing the powder into a pellet. The pellets were sintered, preferably, in a vacuum. The lead wire, which forms the anode termination, is typically made of Ta or Nb wire. Subsequent steps of manufacturing of NbO capacitors are similar to the Ta capacitors. They include formation of dielectric film by anodizing the NbO pellet, impregnation of the formed anode with a $MnO_2$ cathode, top-coating with carbon and silver, assembly, and testing. The advantages of NbO capacitors relative to Ta capacitors include availability of raw materials and a non-burning failure mode. The non-burning failure mode is believed to be due to the fact that NbO has 50% oxygen, stoichiometrically, which makes the igniting energy much higher than that of Ta. Furthermore, after electrical breakdown NbO capacitors have 100 ohm to 1000 ohm residual resistance while Ta and Nb capacitors are typically shorted after electrical breakdown. In comparison to wet Al capacitors, NbO capacitors have higher volumetric efficiency, higher reliability, lower ESR, and better thermal stability of AC characteristics.

The disadvantages of NbO capacitors versus Ta capacitors are lower working voltages, higher DC leakage, lower volumetric efficiency, and higher ESR for a given case size. Higher ESR is caused by lower conductivity of NbO in comparison to conductivity of typical metals like Ta, Nb and Al.

In the prior art, where either Ta or Nb wire are used as the anode lead, oxygen diffusion from NbO powder into the wire takes place during sintering of NbO powder. The driving force for this diffusion is a large difference in oxygen content between NbO, which is about 50% atomic oxygen, and Nb or Ta, which is below about 2% atomic oxygen. Oxygen diffusion increases exponentially with temperature and is very active at the sintering temperature of NbO powder which may exceed about 1200° C. As a result of this diffusion, Ta or Nb wire becomes enriched with oxygen. Adjacent to the wire area NbO powder becomes depleted of oxygen. Calculations described in B. Boiko, Y. Pozdeev, et al., *Thin Solid Films*, 130 (1985) 341, using oxygen diffusion parameters, suggest that depletion of oxygen in NbO powder during sintering results in its transformation into Nb saturated with oxygen in a layer about 10 μm thick surrounding the wire.

The amorphous dielectric film formed on oxygen saturated Nb is highly susceptible to crystallization (Y. Pozdeev Freeman, *Mat. Res. Symp. Proc.*, 788 (2004) 109). When crystals grow in an amorphous matrix of dielectric they eventually disrupt the dielectric field due to mechanical stress caused by differences in specific volume of amorphous and crystalline phases. As a result of disruption of the dielectric, DC leakage increases. Thicker dielectrics in higher working voltage capacitors suffer more from the crystallization which limits the working voltage available in NbO capacitors. Furthermore, higher working voltages require coarse powder and higher sintering temperature. The latter stimulates growth of the oxygen saturated Nb layer around the wire, which makes crystallization of the dielectric even more severe.

Through diligent research the present inventors have developed a method for mitigating the deficiencies of a NbO capacitor thereby allowing the anticipated advantages to be fully exploited. The present invention solves a long standing problem in the art which was previously not understood and for which a solution was lacking.

SUMMARY OF THE INVENTION

It is an object of the present invention to provide an improved capacitor.

A particular object of the present invention is to provide a capacitor utilizing an NbO anode wherein the problems associated with an NbO anode, as realized in the art, are mitigated.

A particular advantage of the present invention is the ability to provide a capacitor comprising an NbO anode utilizing conventional manufacturing equipment thereby allowing the cost advantages of NbO relative to Ta to be realized without compromise.

These and other advantages, as will be realized, are provided in a capacitor. The capacitor has an NbO anode and an NbO anode lead extending from the NbO anode. A dielectric is on the NbO anode and a conductor is on the dielectric.

Yet another embodiment is provided in a capacitor with an NbO anode. A knob comprising NbO is attached to the NbO anode wherein the knob may have a density which is higher than a density of the NbO anode. An anode lead is attached to the knob and a dielectric is on the NbO anode. A conductor is on the dielectric.

Yet another embodiment is provided in a process of manufacturing a capacitor comprising:
providing an NbO anode with an NbO anode lead extending therefrom;
forming a dielectric on the NbO anode; and
forming a conductor on the dielectric.

Yet another embodiment is provided in a process of manufacturing a capacitor comprising:
providing a sintered NbO anode comprising a sintered knob attached thereto wherein the knob comprises NbO;
attaching an anode lead to the knob;
forming a dielectric on the NbO anode; and forming a conductor on the dielectric.

Yet another embodiment is provided in an improved capacitor. The capacitor has an NbO anode and an anode lead extending from the NbO anode. A dielectric is on the NbO anode wherein the dielectric has a first portion and a second portion wherein the second portion is grown over oxygen saturated Nb. A conductor is on the first portion of dielectric only.

SUMMARY OF THE FIGURES

FIG. 3 illustrates a method of forming a capacitor in accordance with the present invention in flow chart representation.

FIG. 4 illustrates a method of forming a capacitor in accordance with the present invention in flow chart representation.

DETAILED DESCRIPTION OF THE INVENTION

The present invention provides a method of forming a capacitor, and capacitor formed thereby, wherein an anode lead comprising NbO is utilized thereby mitigating the effects of oxygen migration which occurs during sintering. In an alternative embodiment a higher density NbO knob is attached to the surface of the anode prior to sintering and an anode lead is embedded into the NbO knob. In a particularly preferred embodiment the conductor is not formed over dielectric formed from oxygen saturated Nb.

The present invention relies on a new understanding in the art. NbO capacitors have been known to suffer from current leakage and other related deficiencies. Through diligent research a portion of the current leakage has been determined to be due to conductor layer formed over a dielectric which has been formed over oxygen saturated Nb as opposed to NbO or Nb metal. While not being limited to any theory, during sintering it is hypothesized that at the interface of NbO and Ta or Nb lead wire a region comprising some level of Nb saturated with oxygen is formed. Upon anodization this region is then hypothesized to form a dielectric which is inferior. In a surprising discovery the cathodic conductor formed over this inferior dielectric is highly susceptible to leakage current and is a source of capacitor deficiency. By avoiding cathodic conductor from being formed over this inferior dielectric the present inventors have realized significant improvements in the resulting capacitor.

The invention will be described with reference to the figures forming an integral, non-limiting, part of the disclosure. Throughout the various figures similar elements will be numbered accordingly.

Figure 1:
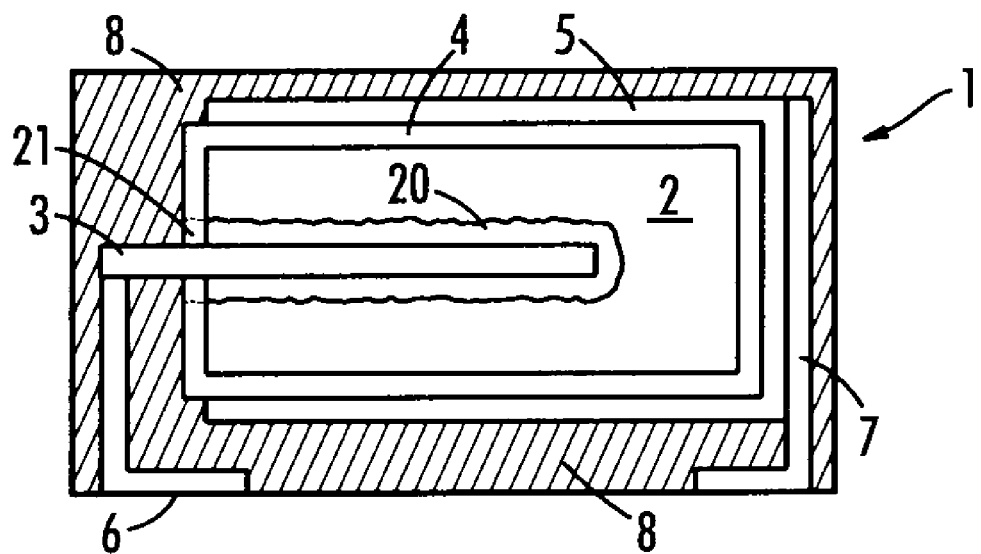
FIG. 1 is a cross-sectional schematic view of an embodiment of the present invention.

An embodiment of the present invention is illustrated in cross-sectional schematic view in FIG. 1. In FIG. 1 a capacitor, generally represented at 1, comprises an anode, 2, of pressed and sintered NbO. An anode lead, 3, which is preferably NbO, extends from the interior of the anode and is in intimate contact with the anode. The intimate contact is preferably established by pressing the anode powder around the anode lead. A lead can be attached to the NbO anode, by welding for example, but this is less desirable. A dielectric layer, 4, is on the surface of the anode. The dielectric layer may be on multiple surfaces of the anode and may be circumjacent to the anode. A cathode layer, 5, is on the surface of the dielectric and separated from the anode by the dielectric. The cathode layer may be on multiple surfaces of the dielectric with the understanding that the cathode and anode are not in direct electrical contact since this would create an electrical short thereby rendering the capacitor useless. An anode termination, 6, is in electrical contact with the anode lead and extends to the exterior of the capacitor thereby allowing the anode termination to form contact with an electrical circuit element. A cathode termination, 7, is in electrical contact with the cathode layer and extends to the exterior of the capacitor thereby allowing the cathode termination to form a contact with an electrical circuit element. The entire capacitor, except for a portion of the anode termination and cathode termination, is preferably encased in an electrically non-conductive material, 8, preferably a non-conductive polymer, thereby prohibiting the capacitor from inadvertent electrical contact. If the anode lead is tantalum or niobium oxygen migration occurs from the anode to the lead. The oxygen migration forms an oxygen saturated Nb region, 20, in the vicinity of the anode lead. When dielectric is formed over the oxygen saturated Nb region, 21, the subsequent cathode conductor is not formed over the oxygen saturated Nb region. Through diligent research it has been determined that formation of cathode over the dielectric formed over oxygen saturated Nb region is detrimental to the electrical properties of the eventual capacitor. Therefore, it is particularly preferred that cathode material be formed only over those portions of the dielectric excluding the dielectric formed over oxygen saturated Nb region.

While not limited to any theory the width of oxygen saturated Nb region, as measured from the anode lead is about 10 µm. Therefore, it is preferable that the cathode not come any closer to the anode lead than about 12 µm and more preferably 10 µm.

Figure 2:
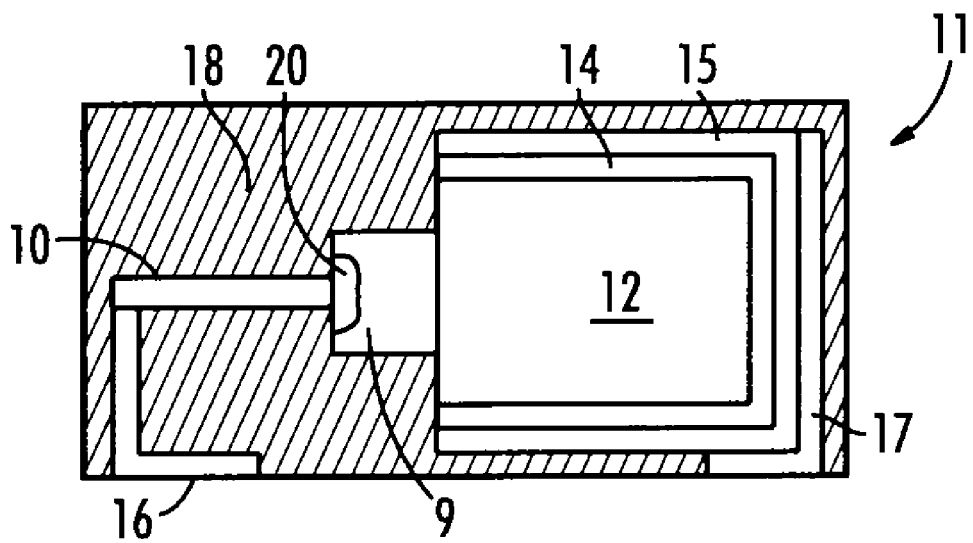
FIG. 2 is a cross-sectional schematic view of an embodiment of the present invention.

Another embodiment of the present invention is illustrated in cross-sectional schematic view in FIG. 2. In FIG. 2 the capacitor, generally represented at 11, comprises an NbO anode, 12. A dielectric, 14, is on the surface of the anode as described supra relative to FIG. 1. A cathode, 15, and associated cathode termination, 17, are provided as described supra relative to FIG. 1. An NbO knob, 9, preferably with a higher density than the anode, is adhered to a surface of the NbO anode. The NbO knob is preferably formed by co-pressing and co-sintering the knob and anode, however, the NbO knob and NbO anode can be pressed and sintered separately and joined by a conductive adhesive or by welding. Co-pressing and co-sintering is preferred. An anode lead, 10, is attached to the NbO knob preferably by embedding and sintering. The anode lead is preferably Nb, Ta or an alloy thereof. An anode termination, 16, is attached to the anode lead and the capacitor is preferably encased in a non-conductive polymer, 18. The oxygen saturated Nb region, 20, is isolated in the knob thereby avoiding electrical contact between the cathode and any dielectric formed over the oxygen saturated Nb region.

It is preferable that the knob have a higher density than the anode. The higher density decreases resistance in the knob and provides improved adhesion to the anode lead. It is preferable that the density of the anode be at least about 2.5 g/cc to no more than about 4.5 g/cc. It is preferable that the density of the knob be at least about 2.8 g/cc to no more than about 5 g/cc. It is preferable that the density of the knob is at least 12% higher than the density of the anode.

An embodiment of the present invention is illustrated in flow chart representation in FIG. 3. In FIG. 3 an anode lead is inserted into an NbO powder at 30. The powder is pressed at 31, thereby embedding the anode lead into the pressed NbO powder thereby forming an anode precursor with anode lead extending therefrom. An NbO anode lead is preferred in one embodiment. The anode precursor is heated to a temperature sufficient to sinter the anode at 32 thereby forming a sintered NbO anode with anode lead extending therefrom. A dielectric is formed on at least one surface of the NbO anode at 33. A particularly preferred dielectric is nominally $Nb_2O_5$. A cathode is formed on the surface of the dielectric at 34. As indicated above the cathode is not formed over portions of oxygen saturated Nb or the dielectric formed on oxygen saturated Nb. The oxygen saturated Nb or dielectric formed over oxygen saturated Nb may be covered by a non-wetting material to insure that the cathode does not encroach on that region of the anode. Anode termination is attached to the anode lead and a cathode termination is attached to the cathode at 35. The capacitor is preferably encased in a non-conductive material at 36 with the exception of some portion of the anode termination and cathode termination which is preferably exposed for attachment to electrical circuitry.

Embodiments of the present invention are illustrated in flow chart representation in FIG. 4. In FIG. 4, NbO powder is provided at 40. The NbO powder is pressed at 41 into an anode. In a parallel process NbO powder is provided at 42 and pressed into a knob at 43. The knob preferably has a higher density than the anode. The knob is then attached to the anode at 44 thereby forming an anode with a knob attached thereto. In an alternative embodiment NbO powder is provided at 45 and pressed at 46 in a manner sufficient to form an anode with a knob pressed therewith to form an anode with a knob attached thereto. The pressing may be concurrent or sequential. The anode with a knob is sintered at 47 to form a sintered anode with a sintered knob attached thereto. In one embodiment the anode and knob may be sintered separately and then combined by attaching the knob to the anode but this is not preferred. An anode lead is attached to the knob at 48, preferably by embedding and sintering. The anode lead is preferably Ta, Nb or an alloy thereof. A dielectric is formed on the anode at 49. A particularly preferred dielectric is nominally $Nb_2O_5$. A cathode is formed on the surface of the dielectric at 50. Anode termination is attached to the anode lead and a cathode termination is attached to the cathode lead at 51. It is preferable to encase the capacitor in a non-conductive material at 52 with the exception of some portion of the anode termination and cathode termination which is preferably exposed for attachment to electrical circuitry.

The process of this invention provides improved performance and higher working voltages for NbO capacitors. To achieve these goals, the part of the anode lead wire in contact with the active capacitor area preferably comprises NbO.

For the purposes of the present invention NbO used in the lead is a homogeneous NbO with stoichiometry of $Nb_{1+x}O_{1-x}$ wherein $-0.1 \leq x \leq 0.1$, and more preferably $-0.01 \leq x \leq 0.01$. Most preferably NbO is a pure material with even stoichiometry.

For the purposes of the present invention NbO used in the anode is a homogeneous NbO with stoichiometry of $Nb_{1+y}O_{1-y}$, wherein $-0.1 \leq y \leq 0.1$, and more preferably $-0.01 \leq y \leq 0.01$. Most preferably NbO is a pure material with even stoichiometry. In another embodiment some portion of the oxygen in NbO may be substituted with nitrogen.

For the purposes of the present invention the term homogenous refers to a material with less than 10% variation in stoichiometric ratio of metal and oxygen throughout the material.

In one embodiment NbO wire, or strips, are embedded into an NbO powder prior to pressing into a pellet. In this embodiment the capacitor is formed in a manner directly analogous to Ta and Nb capacitors with the exception of the materials used.

The cross-sectional shape of the anode lead, or NbO anode lead, is not particularly limited herein. Round, obround, oblong and elliptical are preferred due to the improved contact between the pressed powder and lead. Other shapes, such as polygonal shapes, are suitable but less desirable. The anode lead, or NbO anode lead, may have an aspect ratio of greater than 1 wherein the aspect ratio is the highest ratio of orthogonal cross-sectional lengths.

While not limited to any theory, it is postulated that the lack of an appreciable oxygen gradient between the anode and anode lead minimizes oxygen diffusion between sintered NbO powder and an NbO lead during sintering. The dielectric film formed by anodizing the NbO surface is less prone to crystallization as it is in the case of Nb saturated with oxygen. This prevents disruption of the dielectric created by crystal growth and mitigates DC leakage and increases working voltage of an NbO capacitor. Moreover, the interface between NbO anodes and $Nb_2O_5$ dielectric is thermodynamically more stable than an interface between Nb and $Nb_2O_5$. The more stable dielectric limits oxygen migration from the dielectric into the anode thereby also reducing DC leakage and increasing the working voltage of NbO capacitors.

Another advantage of the present invention is the ability to use conductive polymer as the cathode material thereby reducing ESR of the NbO capacitors. Conductive polymers are not solid electrolytes and can not provide the same self-healing effect to the dielectric as $MnO_2$ cathode. When conductive polymers are used with NbO anodes with Ta or Nb lead wire, which have a high density of defects in dielectric in vicinity of the lead wire, DC leakage is very high. When NbO anodes are manufactured according to this invention, they have low density of defects in the dielectric thereby allowing full utilization of the advantages offered by a conductive polymer cathode. These NbO capacitors have lower and more stable DC leakage, lower ESR, and higher working voltages in comparison to the NbO capacitors manufactured according to the prior art.

The cathode is a conductor preferably comprising at least one of manganese dioxide, a conductive polymeric material or a liquid electrolyte. Particularly preferred conductive polymers include polypyrrole, polyaniline and polythiophene. Metals can be employed as a cathode material with valve metals being less preferred. The cathode may include multiple layers wherein adhesion layers are employed to improved adhesion between the conductor and the termination. Particularly preferred adhesion layers include carbon, silver, copper, or another conductive material in a binder.

The dielectric is a non-conductive layer which is not particularly limited herein. The dielectric may be a metal oxide or a ceramic material. A particularly preferred dielectric is the oxide of the anode due to the simplicity of formation and ease of use. $Nb_2O_5$ is the most preferred dielectric.

The invention has been described with particular reference to the preferred embodiments without limit thereto. Other embodiments, alterations and extensions will be realized which are within the scope of the invention which is more specifically set forth in the claims appended hereto.

The invention claimed is:

1. A capacitor comprising:
   an NbO anode;
   an NbO anode lead extending from said NbO anode;
   a dielectric on said NbO anode; and
   a conductor on said dielectric wherein said conductor is not on dielectric formed on oxygen saturated Nb.

2. The capacitor of claim 1 wherein said NbO anode comprises $Nb_{1+y}O_{1-y}$ wherein $-0.1 < y < 0.1$.

3. The capacitor of claim 1 wherein said NbO anode lead comprises $Nb_{1+x}O_1$, wherein $-0.1 < x < 0.1$.

4. The capacitor of claim 1 wherein said dielectric comprises $Nb_2O_5$.

5. The capacitor of claim 1 wherein said conductor comprises at least one material selected from $MnO_2$, a conductive polymer and a liquid electrolyte.

6. The capacitor of claim 5 wherein said conductive polymer is selected from the group consisting of polypyrrole, polyaniline and polythiophene.

7. The capacitor of claim 1 further comprising at least one element selected from an anode termination in electrical contact with said NbO anode lead and a cathode termination in electrical contact with said conductor.

8. A process of manufacturing a capacitor comprising:
   providing an NbO anode with an NbO anode lead extending therefrom;
   forming a dielectric on said NbO anode; and
   forming a conductor on said dielectric wherein said conductor is not on dielectric formed on oxygen saturated Nb.

9. The process of manufacturing a capacitor of claim 8 wherein said NbO anode comprises $Nb_{1+y}O_{1-y}$ wherein $-0.1<y<0.1$.

10. The process of manufacturing a capacitor of claim 8 wherein said NbO anode lead comprises $Nb_{1+x}O_{1-x}$ wherein $-0.1<x<0.1$.

11. The process of manufacturing a capacitor of claim 8 wherein said dielectric comprises $Nb_2O_5$.

12. The process of manufacturing a capacitor of claim 8 wherein said conductor comprises at least one material selected from $MnO_2$, a conductive polymer and a liquid electrolyte.

13. The process of manufacturing a capacitor of claim 12 wherein said conductive polymer is selected from the group consisting of polypyrrole, polyaniline and polythiophene.

14. The process of manufacturing a capacitor of claim 8 further comprising at least one element selected from attaching an anode termination in electrical contact with said NbO anode lead and attaching a cathode termination in electrical contact with said conductor.

* * * * *